United States Patent [19]
Kjellqvist

[11] Patent Number: 5,996,770
[45] Date of Patent: Dec. 7, 1999

[54] PLUG SCREW FEEDER

[75] Inventor: Olof Kjellqvist, Sundsvall, Sweden

[73] Assignee: Sunds Defibrator Industries AB, Sweden

[21] Appl. No.: 08/933,178

[22] Filed: Sep. 18, 1997

[30] Foreign Application Priority Data

Sep. 19, 1996 [SE] Sweden ................................ 9603423

[51] Int. Cl.⁶ .................................................. B65G 33/32
[52] U.S. Cl. .......................... 198/672; 198/657; 384/583; 384/563
[58] Field of Search .................... 198/672, 674, 198/657; 384/583, 563

[56] References Cited

U.S. PATENT DOCUMENTS

| | | | |
|---|---|---|---|
| 1,244,190 | 10/1917 | Gihon | 384/583 |
| 1,579,737 | 4/1926 | Sweet | 384/583 |
| 1,669,725 | 5/1928 | Scribner | 384/583 |
| 2,591,622 | 4/1952 | Shoup | 384/563 |
| 2,836,473 | 5/1958 | Tyderman | 384/563 |
| 2,891,655 | 6/1959 | Saiberlich | 198/674 |
| 3,580,648 | 5/1971 | Zink | 384/583 |
| 3,602,552 | 8/1971 | Morgan | 198/213 |
| 3,746,412 | 7/1973 | Hay | 384/563 |
| 4,519,496 | 5/1985 | Ludvigsen | 198/676 |
| 4,613,240 | 9/1986 | Hagelthorn | 384/583 |
| 4,641,558 | 2/1987 | Hoffmann | 384/583 |
| 4,951,884 | 8/1990 | Koenig | 198/672 |
| 5,048,979 | 9/1991 | Coates | 384/583 |
| 5,368,399 | 11/1994 | Tremblay | 384/583 |
| 5,560,687 | 10/1996 | Hagelthorn | 384/517 |
| 5,711,393 | 1/1998 | Gage | 384/583 |

FOREIGN PATENT DOCUMENTS 529231  6/1955  Italy ...................................... 198/672

*Primary Examiner*—William E. Terrell
*Assistant Examiner*—Khoi H. Tran
*Attorney, Agent, or Firm*—Lerner, David, Littenberg, Krumholz & Mentlik, LLP

[57] ABSTRACT

Screw feeders are disclosed including a conical feed screw rotatably disposed in a conical screw tube, and a drive shaft mounted at one end of the conical feed screw with a pair of bearings mounting the drive shaft, a fixed ring mounted on the drive shaft, and an axially adjustable sleeve mounted on the drive shaft, with the pair of bearings disposed between the fixed ring and the axially adjustable sleeve in order for the pair of bearings to be pretensioned therebetween.

1 Claim, 2 Drawing Sheets

PLUG SCREW FEEDER

FIELD OF THE INVENTION

The present invention relates to screw feeders. More particularly, the present invention relates to screw feeders with conical feed screws rotatably mounted in a conical screw tube. Still more particularly, the present invention relates to such screw feeders which are mounted on a drive shaft for rotation therewith.

BACKGROUND OF THE INVENTION

Plug screw feeders of the type which utilize a rotatable feed screw are utilized in pulp manufacturing processes. Such processes involve feeding lignocellulosic material, such as wood chips, wood shavings and sawdust, or various non-wood fibers, such as sugarcane bagasse, from a hopper or storage container equipped with the screw feeder to further processing equipment. This further processing equipment can include mechanical refiners or disk refiners, as well as digesters and other pulp treatment devices, such as impregnating equipment. During the infeeding process, the conical screw of the screw feeder compresses the chips into a dense plug which serves to seal against the impregnator vapor pressure, for instance. The chip plug is advanced continuously as it expands into the impregnator, while water present in the chips is drained off through holes in the screw housing. The chip plug is moved in the impregnator towards a conical back-blowing mechanism, which breaks up the plug.

A principal object of the present invention is a means for dealing with the problem of providing a screw feeder that is able to take up the rotational loads and alternating axial loads that occur therein. These loads place the equipment under a great deal of strain, and serious wear will thus occur unless the screw feeder is accurately centered and stable.

SUMMARY OF THE INVENTION

In accordance with the present invention, this and other objects have now been accomplished by the invention of a screw feeder comprising a conical feed screw having a first end and a second end, a conical screw tube, the first end of the conical feed screw being rotatably mounted within the conical screw tube, a drive shaft mounted at the second end of the conical feed screw, a pair of bearings for mounting the drive shaft, a fixed ring mounted on the drive shaft, and an axially adjustable sleeve mounted on the drive shaft, the pair of bearings being disposed between the fixed ring and the axially adjustable sleeve on the drive shaft, whereby the pair of bearings can be pretensioned therebetween.

In accordance with one embodiment of the screw feeder of the present invention, the pair of bearings comprises a pair of roller or ball bearings.

In accordance with another embodiment of the screw feeder of the present invention, the screw feeder includes a nut affixed to the drive shaft, the axially adjustable sleeve being disposed between the nut and one of the bearings on the drive shaft. In a preferred embodiment, the screw feeder includes screw thread means, wherein the nut is affixed to the drive shaft by means of the screw thread means. Preferably, the nut includes a plurality of axially directed setting screws disposed around the circumference of the nut whereby the clearance between the nut and the axially adjustable sleeve can be altered.

BRIEF DESCRIPTION OF THE DRAWINGS

The invention will be more fully appreciated with reference to the following detailed description, which, in turn, refers to the accompanying drawings, wherein.

DETAILED DESCRIPTION

Figure 1:
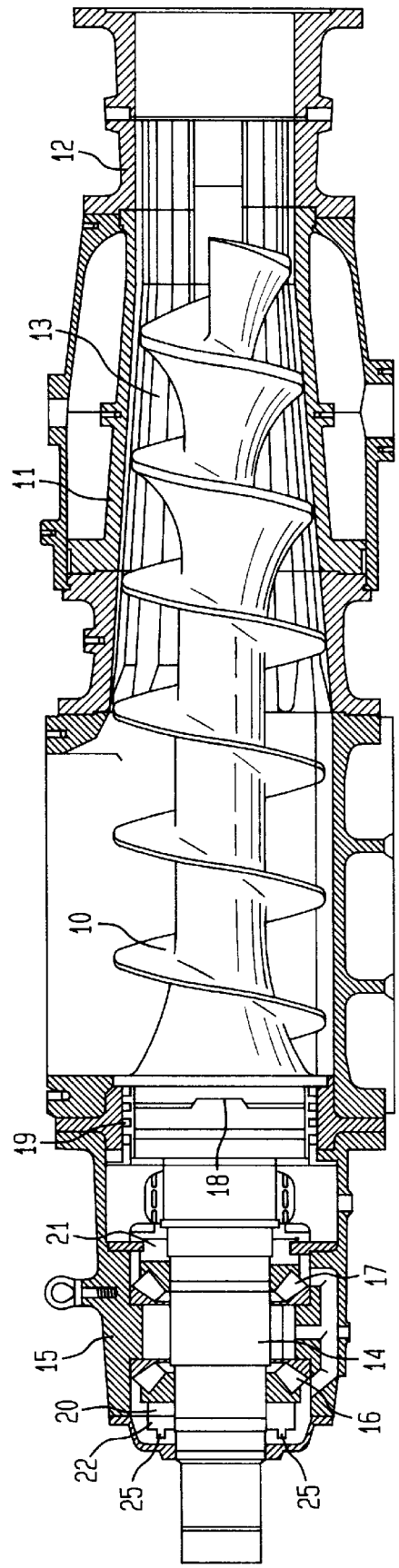
FIG. 1 is a side, elevational, sectional view of a screw feeder in accordance with the present invention.

Referring to the Figures in which like numerals refer to like elements thereof, FIG. 1 is a longitudinal sectional view of the plug screw feeder of the present invention. A conical feed screw 10 is rotatably mounted in a conical screw tube 11. The screw tube 11 opens into a plug tube 12 which is connected, e.g. to an impregnator (not shown). As the material, e.g. wood chips, is advanced through the feeder, the conical screw 10 compacts the material into a dense plug which functions to seal against impregnator vapor pressure. The screw tube 11 has a lining that includes ridges or wear bars 13 which prevent the plug from rotating together with the feed screw. The edges of the ridges are coated with a wear-proof material, as are also the wear surfaces on the conical part of the screw.

The chip plug is advanced continuously into the impregnator as the plug expands, at the same time as water present in the chips is drained through holes in the screw tube 11. During operation of the feeder, the feed screw will be subjected to large and alternating loads, both in the axial and peripheral direction of the screw. These loads subject the screw bearings to significant strain, and the screw must always be centered accurately and stably. The screw drive shaft 14 is mounted in a bearing housing 15 that includes a pair of roller or ball bearings, 16 and 17, such as spherical thrust roller bearings. The screw is connected to the drive shaft by means of a coupling 18 and is embraced in the position of the coupling by a stuffing box 19.

Figure 2:
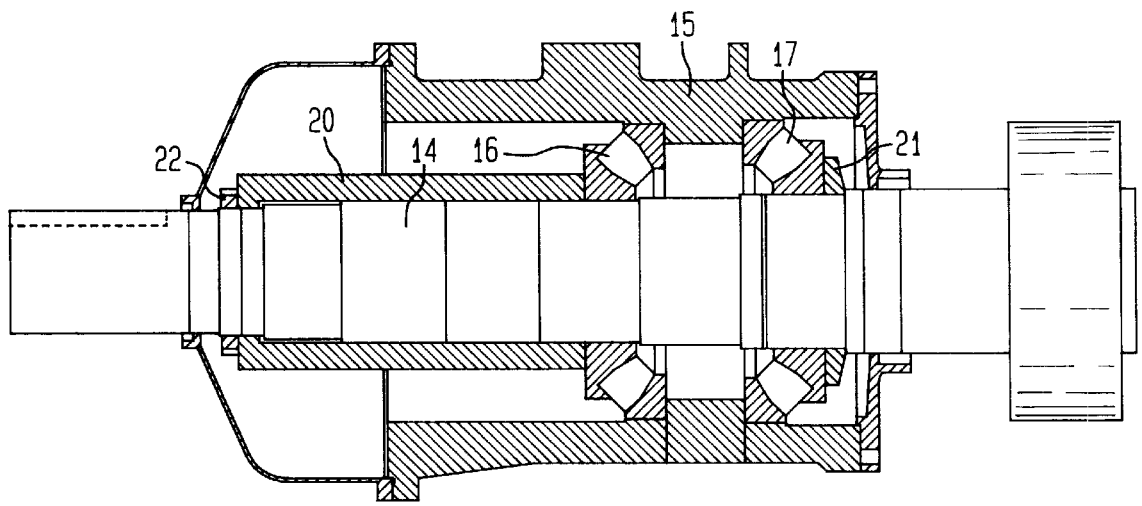
FIG. 2 is a side, elevational, partial sectional, enlarged view of the drive shaft bearing of the screw feeder shown in FIG. 1.

Referring to FIG. 2, there is shown the screw bearing in a larger scale. Because the two roller bearings 16 and 17 are opposed to one other, they are, when taken together, able to take up axial loads on the bearing. In order to prevent the occurrence of a gap in the bearing, the bearing is provided with a collaring device, illustrated in FIG. 2, a sleeve 20, which is placed around the shaft 14 so as to lie in abutment with one bearing 16, while the other bearing 17 supports against a fixed ring 21 on the shaft 14. The axial position of the sleeve 20 can be adjusted with the aid of a nut 22 in threaded engagement with the shaft 14.

Figure 3:
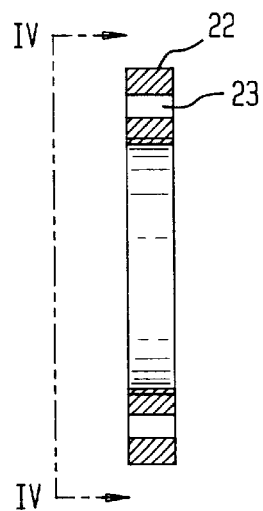
FIG. 3 is a side, elevational, partially sectional, enlarged view of a shaft nut used in the screw feeder of the present invention.
Figure 4:
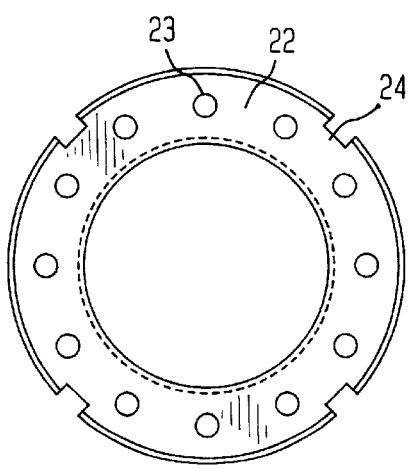
FIG. 4 is a front, elevational view of the shaft nut shown in FIG. 3 taken along lines IV—IV thereof.

As will be evident with reference to FIGS. 3 and 4, the nut 22 includes axially extending threaded holes 23 disposed around the circumference of the nut. These holes 23 receive threaded set screws 25. The nut periphery includes a tool grip 24 for coaction with a screw wrench.

The bearings, 16 and 17, are taken or adjusted in the following manner. The nut 22 is screwed along the shaft 14 until it comes into contact with the sleeve 20. The bearings located between the sleeve 20 and the fixed ring 21 are therewith tightened. The set screws 25 disposed in the hole 23 in the nut 22 are then screwed down until a given clearance (about 0.5 mm) is obtained between the nut 22 and the sleeve 20, so as to obtain the degree of pretensioning desired.

The bearings of the inventive bearing arrangement can be readily tightened and gaps prevented, thereby avoiding serious wear.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A screw feeder comprising a conical feed screw having a first end and a second end, a conical screw tube, said first end of said conical feed screw being rotatably mounted within said conical screw tube, a drive shaft mounted at said second end of said conical feed screw, a bearing housing mounted on said drive shaft having a first bearing assembly adjacent said conical feed screw and a second bearing assembly, a fixed ring mounted on said drive shaft between said first bearing assembly and said conical feed screw, and an axially adjustable sleeve mounted on said drive shaft adjacent said second bearing assembly so that said first bearing assembly and said second bearing assembly are disposed between said axially adjustable sleeve and said conical feed screw, whereby said pair of bearings can be pretensioned between said fixed ring and said axially adjustable sleeve;

a nut affixed to said drive shaft, said axially adjustable sleeve being disposed between said nut and one of said first bearing assembly and said second bearing assembly on said drive shaft; and screw thread means, wherein said nut is affixed to said drive shaft by means of said screw thread means, said nut including a plurality of axially directed setting screws disposed around the circumference of said nut whereby the clearance between said nut and said axially adjustable sleeve can be altered.

* * * * *